US008619558B1

(12) United States Patent
Lok et al.

(10) Patent No.: US 8,619,558 B1
(45) Date of Patent: Dec. 31, 2013

(54) MEMORY MANAGEMENT IN A NETWORK ADAPTER

(75) Inventors: Ying P. Lok, Ladera Ranch, CA (US); Shashank Pandhare, Aliso Viejo, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 512 days.

(21) Appl. No.: 12/176,750

(22) Filed: Jul. 21, 2008

(51) Int. Cl.
*H04J 3/14* (2006.01)

(52) U.S. Cl.
USPC ............ 370/229; 370/231; 370/235; 370/236

(58) Field of Classification Search
USPC ......... 370/394, 412, 413, 474, 229, 231, 235, 370/236
See application file for complete search history.

(56) References Cited

U.S. PATENT DOCUMENTS

| | | | | |
|---|---|---|---|---|
| 5,838,994 A * | 11/1998 | Valizadeh | | 710/56 |
| 6,212,182 B1 * | 4/2001 | McKeown | | 370/390 |
| 6,490,296 B2 * | 12/2002 | Shenoi et al. | | 370/469 |
| 6,539,024 B1 * | 3/2003 | Janoska et al. | | 370/412 |
| 6,718,445 B1 * | 4/2004 | Lewis et al. | | 711/159 |
| 6,728,265 B1 * | 4/2004 | Yavatkar et al. | | 370/468 |
| 6,757,746 B2 * | 6/2004 | Boucher et al. | | 709/250 |
| 6,813,658 B2 * | 11/2004 | Lam et al. | | 710/54 |
| 6,961,835 B2 * | 11/2005 | Lightstone et al. | | 711/171 |
| 6,970,921 B1 * | 11/2005 | Wang et al. | | 709/220 |
| 7,126,969 B1 * | 10/2006 | Uemura et al. | | 370/522 |
| 7,130,272 B1 * | 10/2006 | Gai et al. | | 370/236 |
| 7,181,573 B2 * | 2/2007 | Wolrich et al. | | 711/136 |
| 7,219,171 B2 * | 5/2007 | Guduru | | 710/52 |
| 7,230,917 B1 * | 6/2007 | Fedorkow et al. | | 370/229 |
| 7,269,179 B2 * | 9/2007 | Wolrich et al. | | 370/412 |
| 7,272,144 B2 * | 9/2007 | Cloonan et al. | | 370/395.42 |
| 7,320,042 B2 * | 1/2008 | Trainin | | 710/52 |
| 7,324,547 B1 * | 1/2008 | Alfieri et al. | | 370/461 |
| 7,349,334 B2 * | 3/2008 | Rider | | 370/229 |
| 7,403,976 B2 * | 7/2008 | Brown | | 709/213 |
| 7,562,168 B1 * | 7/2009 | Yifrach et al. | | 710/52 |
| 7,571,246 B2 * | 8/2009 | Virdi et al. | | 709/232 |
| 7,610,413 B2 * | 10/2009 | Pope et al. | | 710/36 |
| 7,660,247 B2 * | 2/2010 | Beukema et al. | | 370/230 |
| 7,743,183 B2 * | 6/2010 | Virdi et al. | | 710/52 |
| 7,743,220 B2 * | 6/2010 | Furtek et al. | | 711/149 |
| 7,873,761 B2 * | 1/2011 | Castanha et al. | | 710/52 |
| 7,895,239 B2 * | 2/2011 | Wolrich et al. | | 707/799 |
| 8,060,644 B1 * | 11/2011 | Michailidis et al. | | 709/234 |
| 8,121,035 B2 * | 2/2012 | Oh et al. | | 370/235 |
| 8,155,002 B2 * | 4/2012 | Robbins | | 370/231 |
| 2005/0226146 A1 * | 10/2005 | Rider | | 370/229 |
| 2006/0050639 A1 * | 3/2006 | Stuart et al. | | 370/235 |
| 2008/0117931 A1 * | 5/2008 | Beukema et al. | | 370/468 |

* cited by examiner

*Primary Examiner* — Brian O'Connor
(74) *Attorney, Agent, or Firm* — Klein, O'Neill & Singh, LLP (57) ABSTRACT

A method and system for processing a received network packet includes providing a network adapter using a predetermined number of buffer sets in a buffer queue. A buffer queue with a plurality of buffer sets less than the predetermined number of buffer sets is provided. Each buffer set includes a plurality of buffers to store and retrieve data indicative of the storage location of the received packet. A buffer set is assigned to store data. After all the data from the assigned buffer set is retrieved, the buffer set is released to the buffer queue for subsequent assignment.

20 Claims, 6 Drawing Sheets

MEMORY MANAGEMENT IN A NETWORK ADAPTER

BACKGROUND

1. Technical Field

This disclosure relates to network adapters.

2. Related Art

Computer networks commonly are used to transfer information to and from a computing system. Network interface cards or adapters (NICs) are commonly used to receive network information (as packets or frames) from other network devices and systems and forward the information to a computing system. NICs are also used to transfer information from a computing system to other network devices and systems.

Typically, NICs use buffers (memory storage modules) to handle network traffic. Receive buffers are used to temporarily store network data received by a NIC, and transmit buffers are used to temporarily store information that is sent by a NIC to the network. Depending on the design requirements of a network adapter, a predetermined number of transmit buffers and receive buffers may be assigned for a NIC to perform its operations.

NICs today can transfer data over a network link at very high rates, for example, at speeds defined by Gigabit Ethernet and 10 Gigabit Ethernet specifications. However, the high-speed NICs have to conform to speed/addressing limitations of existing/legacy type computing system architecture. For example, an x86 architecture limits input/output (I/O) memory address space that is available for a device to 64 KB. 64 KB may not be enough for the NIC to operate with applications that may need more memory. This may discourage computing system application and driver developers to write applications for a high speed NIC because the application developers believe tnat the NIC may not have enough memory to support their applications.

As the NIC transfer speeds continue to increase, there is a need to come up with efficient buffer management in NICs to permit use of high speed NICs in systems with constrained resources, for example, systems with limited memory allocation for use by applications and device drivers.

SUMMARY

In one embodiment, a method for processing a packet received from a network is provided. The method includes providing a network adapter with a predetermined number of buffer sets in a buffer queue; providing the buffer queue with a plurality of buffer sets that are less than the predetermined number buffer sets, each buffer set including a plurality of buffers to store and retrieve data, the data indicative of the storage location of the received packet; wherein a first pointer points to a first buffer set from the plurality of buffer sets, use by a consuming process and a second pointer points to a second buffer set for use by a producing process; wherein the first pointer and the second pointer at an initial stage are separated by at least two buffer sets, by using the first pointer, assigning a buffer set the buffer queue, store and retrieve data; storing the data indicative of the storage location of the received packet in the assigned buffer set; and upon retrieving all the data from the assigned buffer set, releasing the assigned buffer set the buffer queue for subsequent assignment; wherein the first pointer and the second pointer point are adjusted when data is written to the assigned buffer set and read from the assigned buffer set.

In another embodiment, a network system to process a packet received from a network is provided. The network system includes a computing system with a processor executing a driver for interfacing with a network adapter; the network adapter used for receiving packets from a network device and sending packets from the computing system to the network device, wherein the network adapter uses a predetermined number of buffer sets in a buffer queue, the network adapter includes a buffer queue with a plurality of buffer sets less than the predetermined number of buffer sets, each buffer set including a plurality of buffers to store and retrieve data, the data indicative of the location of the storage location of the received packet; and wherein a first pointer points to a first buffer set from the plurality of buffer sets, for use by a consuming process and a second pointer points to a second buffer set for use by a producing process; wherein the first pointer and the second pointer at an initial stage are separated by at least two butter sets; by using the first pointer, a buffer set is assigned from the buffer queue, to store and retrieve data; and upon retrieving data from the assigned buffer set, releasing the assigned buffer set to the buffer queue for subsequent assignment; wherein the first pointer and the second pointer point are adjusted when data is written to the assigned buffer set and read from the assigned buffer set.

This brief summary has been provided so that the nature of the disclosure may be understood quickly. A more complete understanding of the disclosure can be obtained by reference to the following detailed description of the various embodiments thereof concerning the attached drawings.

BRIEF DESCRIPTION OF THE DRAWINGS

The foregoing features and other features of the will now be described with reference to the drawings the various embodiments. In the drawings, the same components have the same reference numerals. The illustrated embodiments are intended to illustrate, but not to limit the disclosure. The drawings include the following Figures.

DETAILED DESCRIPTION

The following definitions are provided for convenience as they are typically (but not exclusively) used in the general networking environment, implementing the various adaptive embodiments described herein.

"BIOS" means a basic input/output system program typically used by a computing system to identify hardware components during an initialization process (also referred to as "booting"). The BIOS prepares computer system to access software programs during the initialization process.

"Buffer" means a memory storage location used for storing information. Typically, a NIC uses a buffer to temporarily store information, "Buffer Set" means a set that includes one or more buffers. For example, a Buffer Set A may include 8 individual buffers of 512 bytes each "Consumer Index" is a pointer to a memory buffer. The consumer index indicates a buffer address for a consuming process to start using a buffer. For example, a NIC, executing a consuming process, may write to a buffer based on the consumer index.

"Consuming Process" is a process that writes to a buffer. For example, a NIC may execute a process to write received network packets to a buffer.

"Operating System" means a computer program that is used for managing and controlling overall computing system operations. Examples include Windows, Linux, Solaris and AIX based operating systems.

"Option ROM" means a read only memory that is called by a host computing system BIOS. Typically, a network adapter includes an Option ROM.

"Producing Process" means a process that releases a buffer set so that data can be written by a consuming process. For example, in a network environment, a network driver may execute a producing process to release a buffer set, so that the buffer set may be available to a NIP, executing a consuming process.

"Producer Index" is a pointer to a buffer indicating to a producing process that a buffer is available.

"PXE" means a Preboot Execution Environment that is used to boot (or initialize) a computing system by transferring an image file from a networked location. When a NIC is used for a network boot operation, the NIC uses a universal network driver interface (UNDI) to execute a PXE protocol.

"NIC" means a network interface card or network interface adapter used for processing network packets between a host operating system and networked devices. NICs comply with different protocols and standards, for example, Ethernet, Gigabit Ethernet and others.

To facilitate an understanding of the various embodiments, the general architecture and operation of a computing system is first described. The specific architecture and operation of the various embodiments will then be described with reference to the general architecture.

Figure 1:
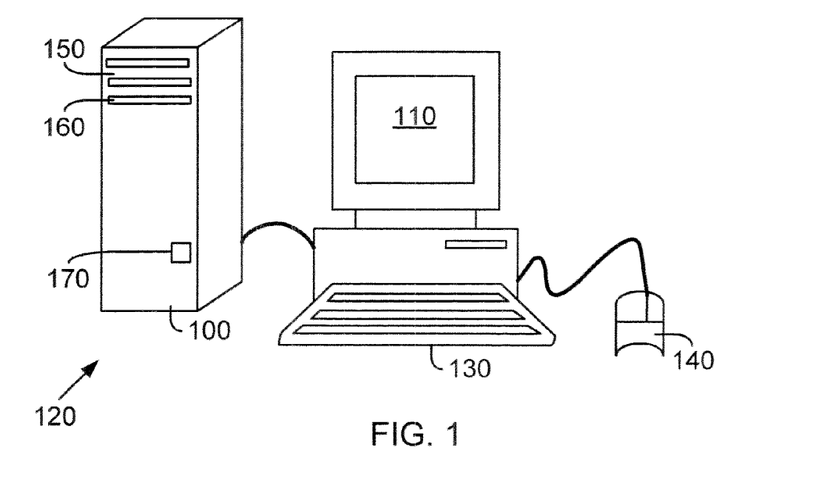
FIG. 1 shows a computing system for use with an embodiment of the current disclosure.

FIG. 1 is a block diagram of a computing system (may also be referred to as a host system) 120 for use with an embodiment of the current disclosure. FIG. 1 includes a host computer 100 and a monitor 110. Monitor 110 may be a CRT type, a LCD type, or any other type of color or monochrome display.

Also provided with computer 100 are a keyboard 130 for entering data and user commands, and a pointing device (for example, a mouse) 140 for processing objects displayed on monitor 110.

Computer 100 includes a computer-readable memory storage device 150 for storing readable data. Besides other programs, storage device 150 can store application programs including web browsers and computer executable code, according to the present disclosure.

According to one aspect of the present disclosure, computer 100 can also access computer-readable devices storing data files, application program files, and computer executable process steps or the like via a removable memory device 160 (for example, a CD-ROM, CD-R/W, flash memory device, zip drives, floppy drives and others).

Computer 100 may include a network interface card (NIC) (also referred to as network interface adapter or "adapter" (shown as 210, FIG. 2) to connect to other computers or network of computers using network connection 170. The NIC may connect computer 100 to other computers or network devices.

It is noteworthy that the present disclosure is not limited to the FIG. 1 architecture. For example, notebook or laptop computers, or any other system capable of connecting to a network, as described below, may be used to implement the various aspects of the present disclosure.

Figure 2:
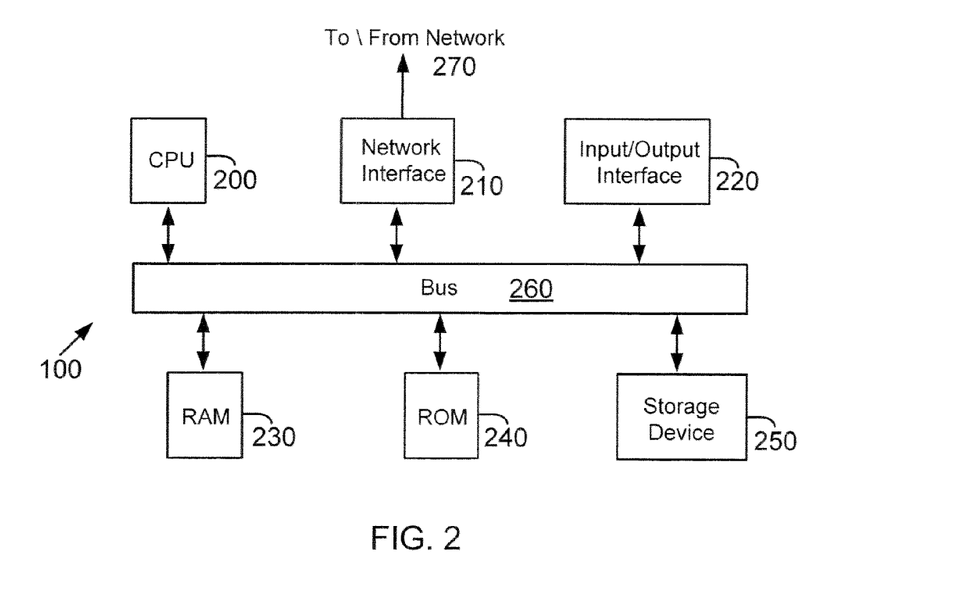
FIG. 2 shows a block diagram of the internal functional architecture of the computing system of FIG. 1.

FIG. 2 shows a top-level block diagram showing the internal functional architecture of computer 100 that may be used to implement various aspects of the current disclosure. As shown in FIG. 2, computer 100 includes a central processing unit (CPU) 200 for executing computer-executable programs, that interfaces with a computer bus 260. CPU 200 may be a general-purpose processor (for example, a Pentium based processor provided by the Intel Corporation®) or any other type of processor. Also shown in FIG. 2 is an input/output interface 220 that operatively connects output display device such as monitors (110), input devices such as keyboards (130) pointing device such as a mouse (140).

A storage device 250 (similar to device 150) also interfaces with the computer 100 through the computer bus 260. Storage device 250 may be disks, tapes, drums, integrated circuits, or the like, operative to hold data by any means, including magnetically, electrically, optically, and the like. In one embodiment, storage device 250 stores operating system program files, application program files, and other files. Some of these files are stored on storage device 250 using an installation program. For example, CPU 200 executes computer executable process steps of an installation program so that CPU 200 can properly execute the application program.

Random access memory ("RAM") 230 also interfaces with computer bus 260 to provide CPU 200 with access to memory storage. When executing stored computer-executable process steps from storage device 250, CPU 200 stores and executes the process steps out of RAM 230.

Read only memory ("ROM") 240 is provided to store invariant instruction sequences such as start-up instruction sequences or basic input/output operating system (BIOS) sequences. In one embodiment, the BIOS may be stored in a memory unit that may be integral with the CPU 200 in the same integrated circuit and operationally coupled to the CPU 200. The BIOS typically includes code to access hardware components such as keyboard, floppy drives, hard disk controllers, USB human interface devices, and storage devices. In addition, plug-in adapter cards such as a NIC and video boards often include their own BIOS, complementing or replacing the system BIOS code for a given component. Sometimes, add-in BIOS code may be stored separate from the main BIOS code, for example, an Option ROM.

In some applications, add-in BIOS from the Option ROM may be used to load an operating system. For example, a NIC may be used to access and load an operating system from a remote location. In a pre-boot execution environment (PXE environment), a client computer system BIOS calls the Option ROM of a NIC attached to the client computer system to access a boot code image from a remote server.

Computing system 120 can be connected to other computing systems through the network interface adapter 210 via a network connection 270 (similar to network connection 170, FIG. 1). The network interface adapter 210 may be adapted to one or more of a wide variety of networks, including local area networks, storage area networks, wide area networks, the Internet, and the like.

The software used to control a peripheral device, for example, a network interface adapter 210 is typically called a device driver. A driver is usually a routine or set of routines that implements device-specific aspects of generic input/output ("I/O") operations. The device driver may be responsible for accessing the hardware registers of the device, starting and completing I/O operations, performing error processing, and often includes an interrupt handler to service interrupts generated by the device. Device drivers are typically kernel mode drivers and often form part of the lowest level of the operating system kernel, with which they are linked when the kernel is built.

An operating system typically provides an interface between application programs and peripheral hardware. For example, operating systems are used to schedule tasks, allocate storage, and handle the interface to peripheral hardware, such as hard drives, optical disk drives, tape drives, network devices and the like. The operating system may be split into a kernel and various system programs. The system programs use facilities provided by the kernel to perform higher-level housekeeping tasks.

As previously discussed, an operating system interfaces application programs to hardware. For example, an application program may transmit a request access peripheral hardware. This request is received by the operating system, which in turn translates the request to a format useable by the device. For example, the operating system may have a set programs that transmits or receives the request, based upon a given format.

For a network device, the operating system may have a set of programs known as network stack, which will permit the request to be transmitted or received in a given format. The operating system then transmits the translated request to the appropriate device and handles communications with the device. As previously discussed, the device driver of the peripheral device, for example, a network interface adapter processes the request and interfaces with other hardware using routines or a set of routines that implements device specific aspects of generic I/O operations, for example, as implemented by the system BIOS or the Option BIOS, or both.

Figure 3:
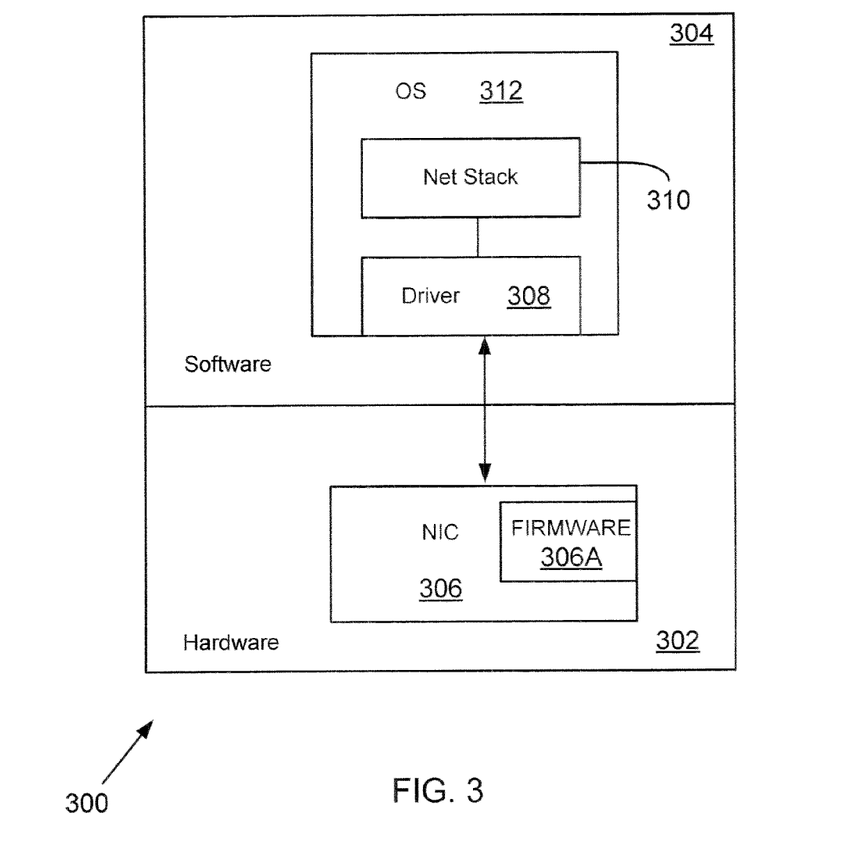
FIG. 3 shows a block diagram a computing system to perform data transfer over a network, using network adapter according to an embodiment of the current disclosure.

FIG. 3 shows the block diagram of an example of a Host system 300 with hardware portion 302 and software portion 304, to perform a data transfer over a network, for example, using a network ml cc adapter (also referred to as "adapter") 306 (similar to network interface 210, (used interchangeably)). The hardware portion 302 may be similar to the host system 100 described with respect to FIG. 1. For example, the hardware portion 302 may include a processor, host memory, one or more devices, including a NIC that are interconnected over a bus. FIG. 3 shows hardware portion 302 with adapter 306.

The software portion 304 may include a NIC device driver 308 and a network stack (also referred to as "Net Stack") 310 executed within operating system 312. Firmware 306A for Adapter 306 communicates with driver 308 (also referred to as NIC driver 308) and driver 308 communicates with the network stack 310. In one embodiment, the network stack 310 may be part of the operating system kernel (not shown). In yet another embodiment, the device driver 308 may be part of the operating system kernel.

To transfer data from host system 300 to another network device and to receive data from the network device, adapter 306 uses a plurality of memory locations (may also be referred to as buffers) to temporarily store data packets. In a receive path (i.e. data packets received from the network device), receive buffers may be used. In a transmit path (i.e. for data sent to the network device) transmit buffers may be used. A completion buffer may be also used to post status when an I/O operation is complete. Usually, driver 308 abstracts hardware specificity and interfaces with the operating system. Driver 308 also allocates buffers for adapter 306.

Figure 4A:
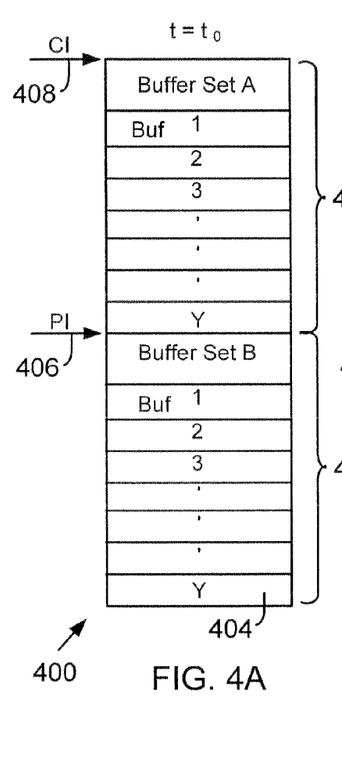
FIGS. 4A-4D show examples of a buffer queue for use with an embodiment of the current disclosure.

FIG. 4A shows an exemplary buffer queue 400, according to an embodiment of the disclosure, for use with adapter 306 to perform data transfer. The buffer queue 400 includes a plurality of buffer sets 402. Although the buffer queue 400 is shown with two buffer sets (Buffer Set A and Buffer Set B), one skilled in the art will appreciate, the buffer queue of this disclosure can be implemented with two or more buffer sets. Each buffer set 402 includes a plurality of buffers 404; say for example, Y number of buffers. In one embodiment, the predetermined number of buffer sets specified by adapter 306 may be greater than the number of buffer sets that are actually available in the buffer queue 400.

In one embodiment, each buffer 404 stores a buffer address pointing to an address of a memory location where data is stored. For example, each buffer 404 may point to the data received in a network packet, over the network.

Each buffer set 402 is addressable by two pointers, a producer index ("PI") 406 and a consumer index ("CI") 408. The producer index 406 points to the buffer set to be used by a producing process. For example, driver 308 may execute a producing process for making Buffer Set A and Buffer Set B available to NIC 306. The producer index 406 indicates to NIC 306 that buffers may be full and should be read out. This allows the NIC driver 308 to read data from the buffers and release the buffer back to a consuming process, for example, NIC 306.

A consumer index 408 points to a buffer set consumed by a consuming process, for example, NIC 306. The consumer index 408 indicates to NIC 306 that a buffer set is available to NIC 306 for writing.

In one embodiment, driver 308 releases a set of buffers to the consuming process. For example, driver 308 may release eight buffers within a set to NIC 306 at any given time.

FIG. 4A shows the pointer location at an initial time, t=t0. At time t=t1 (FIG. 4B), the consumer index 408 moves to the next buffer set (i.e. Buffer Set B). This means that Buffer Set A has been written. This triggers the driver to empty Buffer Set A, while Buffer Set B is being written. At time, t=t2 (FIG. 4C), the consumer index points to Buffer Set A and the producer index 406 points to Buffer Set B.

Figures 4B, 4C:
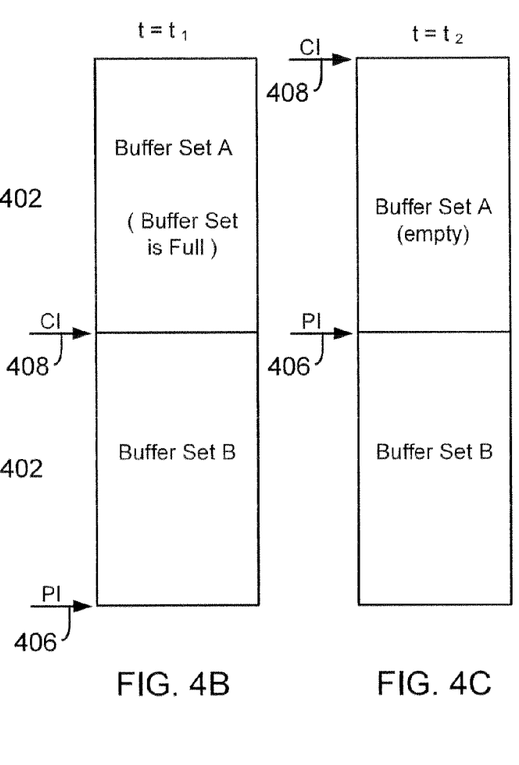

NIC 306 maintains the buffer queue 402 and advertises more buffer sets than what are actually present. NIC 306 is able to do that by separating the consumer index 408 and producer index 406, as shown in FIGS. 4A to 4C. For example, as shown in FIG. 4O, host system coupled to NIC 306 may believe that there are 16 buffer sets available, while NIC 306 only has two buffer sets and moves the consumer index 408 producer index 406 to cycle through two buffer sets, as described above.

Figure 5:
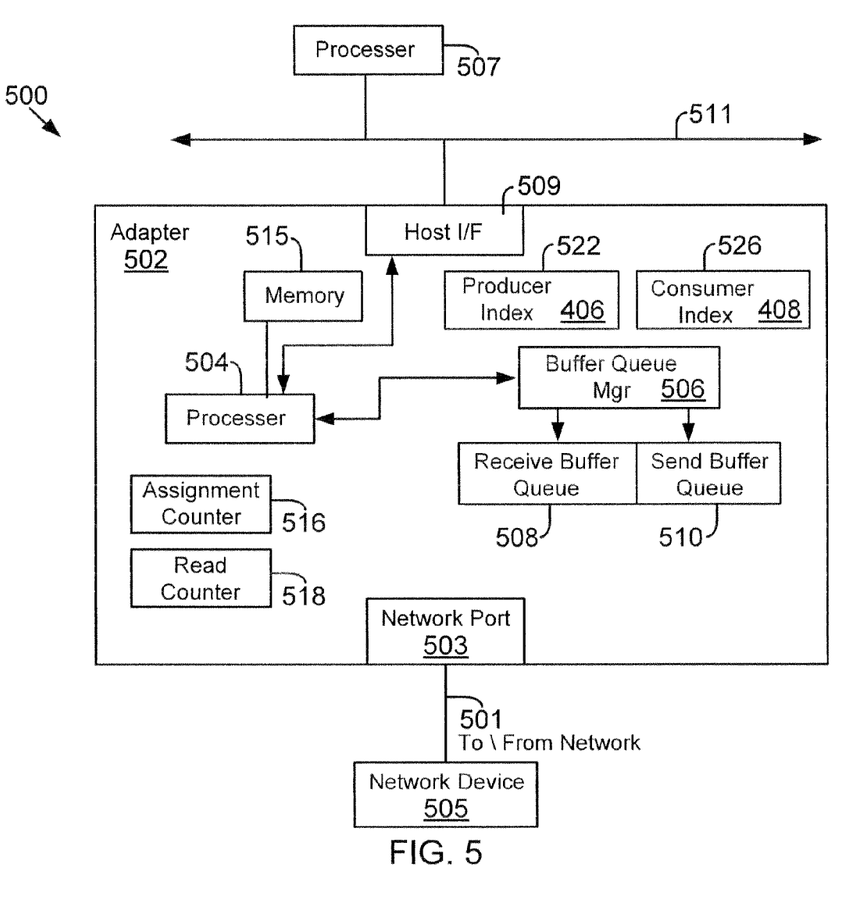
FIG. 5 shows an exemplary network adapter for use with an embodiment of the current disclosure.

Now, a network system 500 to process a packet received from a network is described with reference to FIG. 5. FIG. 5 shows a network adapter 502 (similar to adapter 306 and used interchangeably throughout this specification), to receive and send packets to and from a network/system device 505. Adapter 502 is coupled to host system processor 507 via a bus/link 511. Bus 511 may be a peripheral bus, for example, a PCI, PCI-X or PCI-Express bus. Adapter 502 is coupled to network system/device via network link 501. Any network protocol may be used to transmit and receive data; for example, Ethernet; Fibre Channel; Fibre Channel over Ethernet (FCOE); InfiniBand and others.

The network adapter 502 may include a network processor 504 executing firmware instructions stored in memory 515 to control overall network adapter 502 operations. The network processor 504 may perform various functions of the network adapter 502, including receiving network packets via network link 501 and a network port 503, decoding the network packet, responding to the sender, for example, another system 505, assembling a network packet to be sent via network link 501 and communicating with the host processor 507 through host interface 509, over bus 511.

The network adapter 502 includes a buffer queue manager 506 to manage various buffer queues, including, receive buffer queues 508 and send buffer queues 510. The receive buffer queue 508 may include a plurality of buffer sets, as shown in FIGS. 4A-4D and each buffer set may include a plurality of buffers.

According to an embodiment his disclosure, network adapter 502 uses buffer queue manager 506 to interface with NIC driver 308 for managing the buffer queues.

According to an embodiment of this disclosure, a producing and consuming process may have a limitation on the amount of memory that is made available to a process. For example, the requirements of host system architecture may limit the amount of memory available for use by a device driver (for example, driver 308, FIG. 3). The device driver may be a producing process that releases a buffer set for consumption.

According to an embodiment of this disclosure, the number of buffer sets available for a process is chosen to satisfy the requirements of the system architecture, which may be less than the pre-determined number of buffer sets required by the network adapter. In one embodiment, the number of buffer sets in a buffer queue is two, although, the number may be higher, if the architecture provides for a higher amount of memory available for a process.

According to an embodiment of this disclosure, the network adapter includes an assignment counter 516. The assignment counter 516 counts the number of buffer sets that have been used by a consuming process, after assignment of the first buffer set by producing process. The assignment counter 516 is incremented after each subsequent use of a buffer set. When the buffer count reaches a number equal to the pre-determined number of buffer sets, the buffer queue is reset. For example, producing process expects 16 buffer sets to be assigned at a given time, the buffer queue is reset after 16 buffer sets have been assigned.

Note that the number of buffer sets available for assignment by a buffer queue according to an embodiment this disclosure is less than the pre-determined number of buffer sets used by the producing process. As per the teachings of this disclosure, a buffer set may be reused by the network adapter after a producing process has retrieved data from the buffers of the assigned buffer set, as further described below.

According to an embodiment of this disclosure, the network adapter 306 includes a buffer read counter 518. The buffer read counter 518 keeps count of a number of buffers (404, FIG. 4A) that have been read. After a buffer is read, the buffer read counter 518 is incremented. When the buffer read counter 518 reaches the number of buffers available in a buffer set, the buffer set is released back to the buffer queue (508 or 510) for reuse for subsequent assignment.

In one embodiment, producer index 406 is maintained in a producer register 522. The consumer index 408 is maintained in a consumer register 526. The producer register 522 and the consumer register 526 may be updated to indicate the latest value of the producer index and consumer index values. By adjusting the index values, one can use two sets of buffers, while a host system process believes that there are more than two sets of buffers that are available for use. Hence, applications at a host system level can be developed to interface with NIC 502 because the application developers believe that there is more memory available for process execution.

As one skilled in the art appreciates, various counters disclosed in this disclosure, for example, the assignment counter 516 and buffer read counter 518 may be implemented in hardware, software or firmware, or a combination thereof.

Figure 6A:
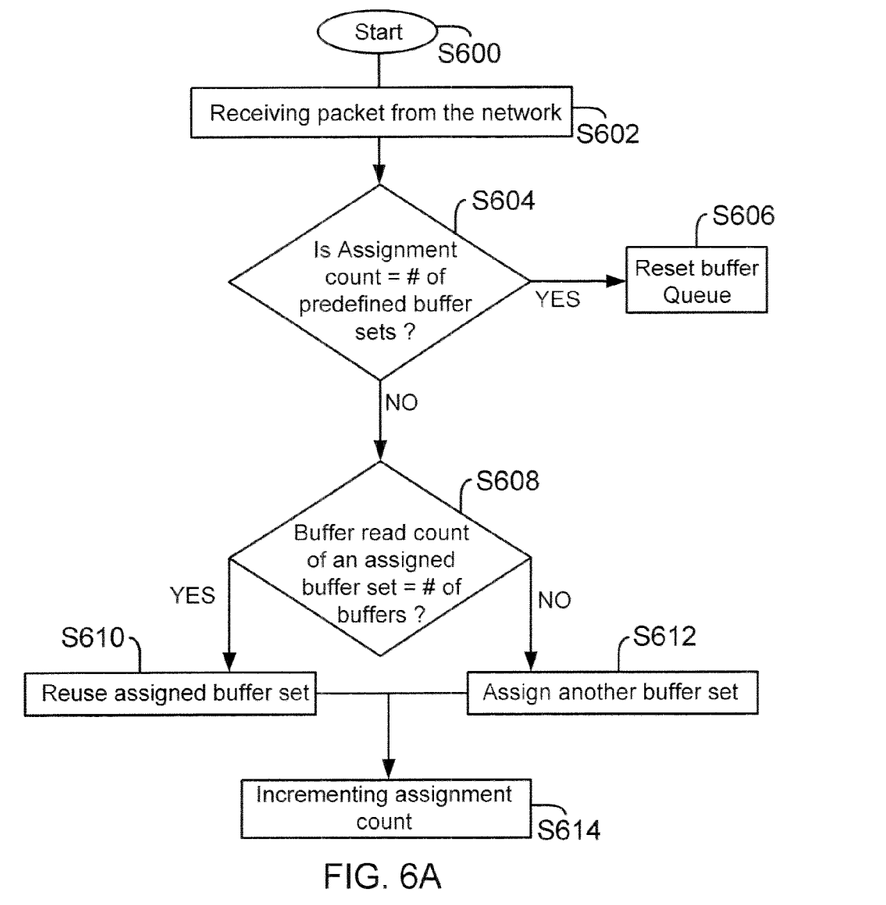
FIGS. 6A and 6B are exemplary processes use with an embodiment of the current disclosure.
Figure 6B:
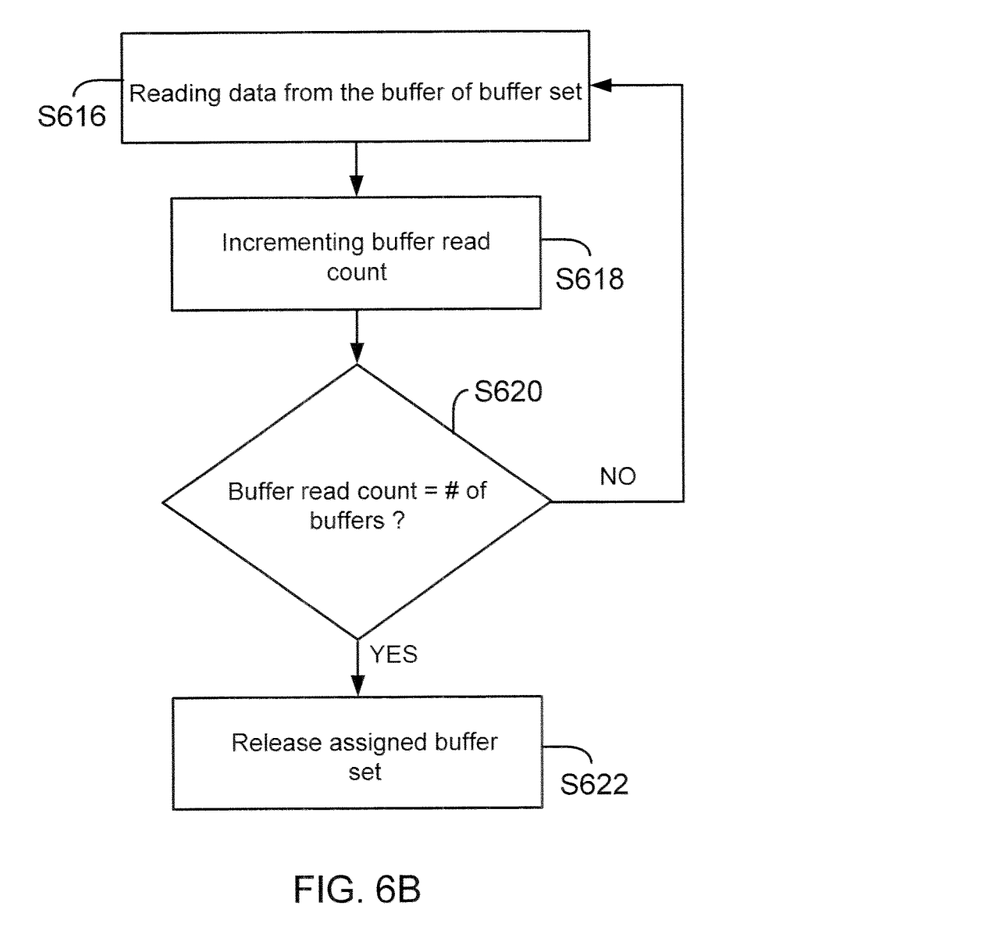

The method of processing a packet received from the network will now be described with respect to FIG. 6A and FIG. 6B. FIG. 6A is related to a consuming process and FIG. 6B is related to a producing process.

Now, referring to FIG. 6A, the process starts in step 600. In step S602, a network packet is received by adapter 502. The network adapter 502 processes the incoming packet. As discussed above, with respect to FIGS. 4A-D, NIC driver 308 assigns buffer sets for consumption. Based on consumer index values, the buffers are written by NIC 502.

In step S604, the buffer queue manager 506 checks to see if the assignment count is equal to a predetermined number of buffer sets. If the assignment count is equal to the predetermined number of buffer sets, then, in step S606, the buffer queue is reset.

If the assignment count is not equal to the predetermined number of buffer sets, then, in step S608, the buffer queue manager 506 checks to see if the buffer read count of an assigned buffer set is equal to the number of buffers in a buffer set. If the buffer read count of an assigned buffer set is equal to the number or buffers in the buffer set, in step S610, the assigned buffer set is reused by NIC 502, i.e., the consuming process stores the data in the buffers of the assigned buffer set.

If the buffer read count of an assigned buffer set is not equal to the number of buffers in the buffer set, in step S612, another buffer set from the buffer queue is assigned for use. The buffer queue manager 506 updates the consumer register 526 with the address of the assigned buffer set, as the consumer index. The consuming process stores the data in the buffers of the assigned buffet set, indicated by the consumer index. The producer index register 522 is also updated so that NIC driver 308 knows to read from a buffer set and then release it back to the consuming process.

In step S614, the assignment count is incremented to indicate the assignment of a buffer set. The buffer read count for the buffer set is set to zero, as no buffer has been read yet. As one skilled in the art appreciates, the process described herein can be used with as little as just two buffer sets.

Once the data is available in a buffer set, the network adapter 502 may initiate an action to indicate the availability of the data to a producing pr example, this may be accomplished by initiating an interrupt request to NIC driver 308. Then, the producing process can initiate the retrieval of data from the buffers of the buffer set that was previously stored by the consuming process.

Now, referring to FIG. 6B, in step S616, the buffers of the buffer set are read. For example, producing process reads the data stored in the buffers the assigned buffer set, by using the address indicated by the producer index for the assigned buffer set. After the producing process reads a buffer of toe buffer set, in step S618, the buffer read count is incremented.

In step S620, the process determines if the buffer read count is equal to the number of buffers of the buffer set. If the buffer read count is not equal to the number of buffers of the buffer set, the next buffer in the buffer set is read by the producing process (S616). If the buffer read count is equal to the number of buffers in the buffer set, in step S622, the buffer set that was just read is released back to the buffer queue for subsequent use.

As one skilled in the art appreciates, the system and method described in this disclosure can provide a mechanism to efficiently use memory available for a device driver, yet meeting the buffer set requirements network adapter.

In another embodiment, a network adapter can side step system level architectural limitations by making host application providers believe that more memory is available for them to write applications, when in fact, only two buffer sets are used by manipulating a consumer index and producer index.

Although the present disclosure has been described with reference to specific embodiments, these embodiments are illustrative only and not limiting. Many other applications and embodiments of the present disclosure will be apparent in light this disclosure and the following claims.

What is claimed is:

1. A method for processing a packet received from a network, the network including a network adapter having a predetermined number of buffer sets in a buffer queue, the method comprising:

the network adapter advertising to a computing system an advertised number of buffer sets available in the buffer queue, the advertised number of buffer sets being greater than the predetermined number of buffer sets so that it appears to the computing system that more buffer sets are available in the network adapter than actually are available, each buffer set including a plurality of buffers to store and retrieve data, the data indicative of a storage location of the received packet;

wherein a first pointer points to a first one of the buffer sets for use by a consuming process and a second pointer points to a second one of the buffer sets for use by a producing process;

wherein the first pointer and the second pointer at an initial stage are separated by at least two of the buffer sets;

by using the first pointer, assigning the first buffer set to store and retrieve data;

storing the data indicative of the storage location of the received packet in the assigned buffer set; and upon retrieving all the data from the assigned buffer set, releasing the assigned buffer set to the buffer queue for subsequent assignment;

wherein the first pointer and the second pointer are adjusted when data is written to the assigned buffer set and read from the assigned buffer set.

2. The method of processing of claim 1 further comprising:

assigning another buffer set from the buffer queue, to store and retrieve data if all the data from the assigned buffer set has not been retrieved.

3. The method of processing of claim 2, further comprising:

counting a number of assignments of buffer sets and resetting the buffer queue upon assigning the predetermined number of buffer sets.

4. The method of processing of claim 2, further comprising:

counting a number of retrievals of data from the buffers of the assigned buffer set to determine retrieval of data from the buffers of the assigned buffer set.

5. The method of processing of claim 1, wherein the buffer set includes a plurality of buffers and data stored in the buffer is an address pointer, pointing to the storage location of the received packet.

6. The method of processing of claim 1, further comprising:

maintaining the first pointer as a consumer index pointing to a buffer address of the buffer set to store data.

7. The method of processing of claim 6, further comprising:

maintaining the second pointer as a producer index pointing to the buffer address of the buffer set where data was stored using the consumer index.

8. The method of processing of claim 1, wherein each buffer set has Y buffers and upon successively retrieving the data stored in Y buffers of the assigned buffer set, releasing the buffer set for subsequent assignment.

9. The method of processing of claim 1, wherein storing the data is initiated after processing a minimum number of packets of data and the number of buffers in a buffer set is a multiple of the minimum number of packets of data processed.

10. The method of processing of claim 9, wherein the minimum number of packets of data processed is eight, buffer sets are at least two and number of buffers in each buffer set is at least eight.

11. A network system to process a packet received from a network, the network system comprising:

a computing system with a processor for executing a driver for interfacing with a network adapter for receiving packets from a network device and sending packets from the computing system to the network device, wherein the network adapter uses a predetermined number of buffer sets in a buffer queue, the network adapter advertising to the computing system an advertised number of buffer sets available in the buffer queue, the advertised number of buffer sets being greater than the predetermined number of buffer sets so that it appears to the computing system that more buffer sets are available in the network adapter than actually are available, each buffer set including a plurality of buffers to store and retrieve data, the data indicative of the location of a storage location of the received packet; and wherein a first pointer points to a first one of the buffer sets for use by a consuming process and a second pointer points to a second one of the buffer sets for use by a producing process;

wherein the first pointer and the second pointer at an initial stage are separated by at least two of the buffer sets;

by using the first pointer, the first buffer set is assigned to store and retrieve data;

the data indicative of the storage location of the received packet is stored in the assigned buffer set; and upon retrieving all data from the assigned buffer set, the assigned buffer set is released to the buffer queue for subsequent assignment;

wherein the first pointer and the second pointer are adjusted when data is written to the assigned buffer set and read from the assigned buffer set.

12. The system of claim 11, wherein another buffer set from the buffer queue is assigned, to store and retrieve data if all the data from the assigned buffer set has not been retrieved.

13. The system of claim 12, wherein the network adapter includes an assignment counter to count a number of assignments of buffer sets and the buffer queue manager resets the buffer queue upon assigning number of assignments equal to the predetermined number of buffer sets.

14. The system of claim 11, wherein the network adapter includes a buffer read counter to count number of buffers of an assigned buffer set that has been retrieved.

15. The system of claim 11, wherein a buffer queue manager maintains the first pointer as a consumer index pointing to the buffer address of the buffer set to store data.

16. The system of claim 15, wherein the buffer queue manager maintains the second pointer as a consumer index pointing to the buffer address of the buffer set where data was stored using the consumer index.

17. The system of claim 11, wherein each buffer set has Y buffers and a buffer queue manager assigns another buffer set to store and retrieve data if successive retrieval of data stored in Y buffers of the assigned buffer group is not complete.

18. The system of claim 11, wherein the network adapter processes a minimum number of packets of data, before storing the data in the buffer set and the number of buffers in a buffer set is a multiple of the minimum number of packets of data processed by the network adapter.

19. The system of claim 18, wherein the number of buffer sets is at least two and the number of buffers in each buffer group is at least eight.

20. The system of claim 11, wherein the minimum number of packets of data processed by the network adapter, before storing the data in the buffer set is eight.

* * * * *

UNITED STATES PATENT AND TRADEMARK OFFICE
CERTIFICATE OF CORRECTION

PATENT NO. : 8,619,558 B1
APPLICATION NO. : 12/176750
DATED : December 31, 2013
INVENTOR(S) : Ying P. Lok et al.

It is certified that error appears in the above-identified patent and that said Letters Patent is hereby corrected as shown below:

In the Specification

In column 1, line 37, delete "tnat" and insert -- that --, therefor.

In column 1, line 52, delete "number buffer" and insert -- number of buffer --, therefor.

In column 1, line 55, delete "sets," and insert -- sets, for --, therefor.

In column 1, line 59, delete "buffer sets," and insert -- buffer sets; --, therefor.

In column 1, line 60, delete "buffer set" and insert -- buffer set from --, therefor.

In column 1, line 60, delete "queue, store" and insert -- queue, to store --, therefor.

In column 1, line 64, delete "set the" and insert -- set to the --, therefor.

In column 2, line 3, delete "a processor" and insert -- a processor for --, therefor.

In column 2, line 19, delete "butter" and insert -- buffer --, therefor.

In column 2, line 35, delete "drawings" and insert -- drawings of --, therefor.

In column 2, line 44, delete "diagram a" and insert -- diagram of a --, therefor.

In column 2, line 45, delete "network, using" and insert -- network, using a --, therefor.

In column 2, line 51, delete "processes use" and insert -- processes for use --, therefor.

In column 2, line 63, delete "prepares computer" and insert -- prepares the computer --, therefor.

In column 2, line 67, delete "information," and insert -- information. --, therefor.

In column 3, line 24, delete "NIP," and insert -- NIC, --, therefor.

In column 4, lines 29-30, delete "computer executable" and insert -- computer-executable --, therefor.

In column 5, line 21, delete "request access" and insert -- request to access --, therefor.

In column 5, line 24, delete "set programs" and insert -- set of programs --, therefor.

In column 5, line 42, delete "ml cc" and insert -- interface --, therefor.

Figure 4D:
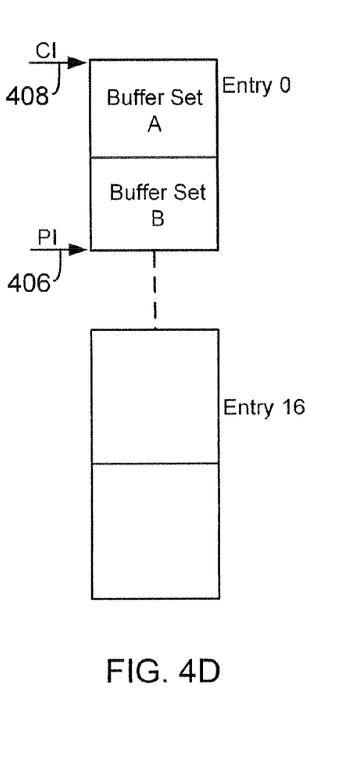

In column 6, line 47, delete "in FIG. 40," and insert -- in FIG. 4D, --, therefor.

In column 6, line 47, delete "host system" and insert -- a host system --, therefor.

Signed and Sealed this
Twenty-seventh Day of May, 2014

Michelle K. Lee
*Deputy Director of the United States Patent and Trademark Office*

CERTIFICATE OF CORRECTION (continued)
U.S. Pat. No. 8,619,558 B1

In column 6, line 50, delete "408 producer" and insert -- 408 and producer --, therefor.

In column 6, line 60, delete "system/device" and insert -- system/device 505 --, therefor.

In column 7, line 13, delete "his disclosure," and insert -- of this disclosure, --, therefor.

In column 7, line 41, delete "For example," and insert -- For example, if a --, therefor.

In column 7, line 45, delete "embodiment" and insert -- embodiment of --, therefor.

In column 8, line 14, delete "FIGS. 4A-D," and insert -- FIGS. 4A-4D, --, therefor.

In column 8, line 27, delete "number or buffers" and insert -- number of buffers --, therefor.

In column 8, line 36, delete "buffet" and insert -- buffer --, therefor.

In column 8, line 47, delete "producing pr example," and insert -- producing process. For example, --, therefor.

In column 8, line 53, delete "For example," and insert -- For example, the --, therefor.

In column 8, line 54, delete "buffers the" and insert -- buffers of the --, therefor.

In column 8, line 56, delete "buffer of toe" and insert -- buffer of the --, therefor.

In column 9, line 2, delete "requirements network" and insert -- requirements of a network --, therefor.

In column 9, line 13, delete "light this" and insert -- light of this --, therefor.